UNITED STATES PATENT OFFICE 2,514,688

STABILIZATION OF 3,4-DIHYDRO-1,2-PYRAN-2-CARBOXALDEHYDE

Richard R. Whetstone, Berkeley, Calif., assignor to Shell Development Company, San Francisco, Calif., a corporation of Delaware No Drawing. Application February 3, 1948, Serial No. 6,013

7 Claims. (Cl. 260—333)

This invention relates to a method of stabilizing 3,4-dihydro-1,2-pyran-2-carboxaldehyde to make possible its storage over prolonged periods of time, in the presence or absence of light, and to minimize the deleterious changes otherwise occurring therein under normal and usual conditions of transportation and storage.

The compound 3,4-dihydro-1,2-pyran-2-carboxaldehyde is a heterocyclic unsaturated aldehyde having a structure that may be represented by the formula

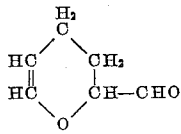

When freshly prepared it is a clear, water-white mobile liquid having a refractive index of about 1.463 to 1.466 and a boiling point of about 88° C. under 90 millimeters mercury pressure and about 146° C. under 760 millimeters mercury pressure. Because of its particular chemical structure it is an unusually versatile chemical intermediate which can be employed for the preparation of a variety of chemical compounds which are useful in diverse fields.

When this heterocyclic aldehyde is stored in a sealed transparent container, such as a clear glass container, in a location open to the light, it is converted in a relatively short time, usually within not more than about a month, to a viscous liquid, and eventually to a polymeric solid. These changes may be retarded in part either by adding to the 3,4-dihydro-1,2-pyran-2-carboxaldehyde an effective amount (generally from about 0.005% to about 5%, by weight) of a mono-, di- or trihydric phenol, such as a hydroquinone, benzoquinone, naphthoquinone, hydroquinone monomethyl ether, pyrogallol, carvacrol, o-aminophenol, catechol, resorcinol, nitrophenol, thymol, phloroglucinol, or the like, or by storing the aldehyde in the absence of actinic light, as in an opaque container or a glass container non-transmissive to actinic light, or in a location protected from the light, or by both adding a phenol and excluding light. However, it has been further discovered that whether or not such a phenol is added, 3,4-dihydro-1,2-pyran-2-carboxaldehyde still increases in viscosity, albeit at a retarded rate, when stored in the dark, until, after a number of months, it is completely transformed to an insoluble solid material. This gradual increase in viscosity and eventual conversion to a solid is unaffected by the presence of phenolic antioxidants such as hydroquinone, and occurs both in the presence and the absence of light. This is evidenced by the fact that samples of 3,4-dihydro-1,2-pyran-2-carboxaldehyde stored under the following conditions all increase in viscosity (and refractive index, a convenient measure of the change) at substantially equal rates:

A. With 0.1% hydroquinone added and stored in the dark at room temperatures.

B. With no additive and stored in the dark at room temperatures.

C. With no additive and stored in the dark at refrigerator temperatures (5° to 10° C.).

D. With 0.1% hydroquinone added and stored in a clear glass container at room temperatures in the light (diffused daylight).

The ineffectiveness of hydroquinone for preventing the gradual increase in viscosity of 3,4-dihydro-1,2-pyran-2-carboxaldehyde stored in the dark is further illustrated by the fact that samples containing 0.1%, 0.25% and 0.5% of hydroquinone when stored in the dark all increase in viscosity at equal rates.

It will be evident that this gradual increase in the viscosity of 3,4-dihydro-1,2-pyran-2-carboxaldehyde is highly disadvantageous because it precludes its economic storage over any prolonged periods of time. As a consequence, it is necessary either to limit the time of storage to an undesirably short time, within which excessive change does not occur, or to encounter the risk of involving serious losses of the product due to its conversion to the viscous, or even solid material formed under such conditions of storage.

It has been discovered in accordance with the present invention that this gradual change occurring over prolonged periods of time in the absence of light may be prevented or effectively reduced by adding to the 3,4-dihydro-1,2-pyran-2-carboxaldehyde a small amount of tannic acid (also known as gallotannic acid, or tannin; see, for example, The Pharmacopoeia of the United States of America, XIII) with or without the inclusion therewith of an antioxidant, such as a polyhydric phenol. Samples of the dihydropyran carboxaldehyde containing small amounts of tannic acid may be stored in the dark over periods of time as long as eighteen months without excessive change, whereas otherwise identical samples containing no tannic acid and stored under the same conditions for an equal length of time generally are completely converted to undesirable solids. Very small amounts of tannic acid are effective, although larger amounts than absolutely required may be used. The addition to the 3,4-dihydro-1,2-pyran-2-carboxaldehyde of from as little as 0.001% of its weight of tannic acid has an appreciable retarding effect upon the deterioration, and amounts as high as 15% may be added if desired. A preferred range is from about 0.01% to about 5% by weight of tannic acid, based upon the weight of the 3,4-dihydro-1,2-pyran-2-carboxaldehyde.

The effect of tannic acid in preventing or reducing the transformation of 3,4-dihydro-1,2-pyran-2-carboxaldehyde in the absence of actinic light to undesirable viscous or solid materials appears to be highly specific, and not obtainable with materials representative of classes of compounds frequently employed as stabilizers for polymerizable unsaturated compounds. For example, metallic copper, cuprous chloride, and triamylamine present at concentrations of 0.1% have been found actually to increase the rate of change in viscosity of 3,4-dihydro-1,2-pyran-2-carboxaldehyde stored in the dark. The following materials present at concentrations of 0.1% were found to be without effect upon the rate of change of viscosity of the dihydropyran carboxaldehyde stored in the dark: di-t-butylhydroquinone, hydroquinone, diethyl ether of hydroquinone, t-butyl catechol, pyrogallol, 2,6-di-t-butyl-p-cresol, 2,4 - dimethyl - 6 - t - butylphenol, phenyl beta-naphthylamine, phenyl alpha-naphthylamine, quinoline, and benzyl disulfide.

As a result of the present invention, it has become possible to store 3,4-dihydro-1,2-pyran-2-carboxaldehyde over prolonged periods of time without encountering excessive deterioration, polymerization, or other undesired changes therein. Production, distribution, and utilization of this valuable compound therefore have been facilitated by the present invention because of the increased stability which is obtained according to the practice of the invention.

The following examples will illustrate the invention defined in the appended claims:

*Example I*

A freshly prepared portion of 3,4-dihydro-1,2-pyran-2-carboxaldehyde was placed in a glass container, the container was sealed, and stored in the dark. After eight months' storage, the aldehyde has been transformed to a viscous liquid having a refractive index, $n_D^{20}$, of 1.5043 (compared to the initial value of 1.4638) and after 18 months the original material had been completely converted to a solid.

At the same time, there was mixed into a further portion of the same preparation of the 3,4-dihydro-1,2-pyran-2-carboxaldehyde 0.1% of its weight of tannic acid, and the portion containing tannic acid was stored under identical conditions with the unstabilized sample. After eight months' storage the stabilized sample was a fluid liquid having a refractive index only 0.0111 greater than the initial value. After eighteen months it still was liquid.

*Example II*

3,4-dihydro-1,2-pyran-2-carboxaldehyde may be rendered stable to both light and prolonged storage by incorporating therewith 0.25% by weight of hydroquinone and 0.1% by weight of tannic acid. The thus stabilized dihydropyran carboxaldehyde exhibits excellent stability when stored either with or without access of actinic light.

*Example III*

As a further illustration of the invention, separate portions of 3,4-dihydro-1,2-pyran-2-carboxaldehyde may be stabilized for prolonged storage in the absence of light by incorporating therewith 0.1%, 0.5%, 1% and 5%, respectively, of tannic acid. When stored in a sealed non-corrosive metal container or in a glass container opaque to actinic light, there is obtained excellent stability under conditions of prolonged storage.

I claim as my invention:

1. As a new composition of matter, 3,4-dihydro-1,2-pyran-2-carboxaldehyde containing from about 0.001% to about 15% by weight of tannic acid.

2. As a new composition of matter, 3,4-dihydro-1,2-pyran-2-carboxaldehyde containing from about 0.01% to about 5% by weight of tannic acid.

3. The method of stabilizing 3,4-dihydro-1,2-pyran-2-carboxaldehyde against spontaneous deterioration under conditions of storage over prolonged periods of time which comprises incorporating therewith from about 0.001% to about 15% by weight of tannic acid.

4. The method of storing 3,4-dihydro-1,2-pyran-2-carboxaldehyde over prolonged periods of time which comprises incorporating therewith from about 0.001% to about 15% by weight of tannic acid and maintaining the mixture during subsequent storage inaccessible to actinic light.

5. As a new composition of matter, a mixture comprising 3,4 - dihydro - 1,2 - pyran - 2 - carboxaldehyde, from about 0.005% to about 5% by weight thereof of a phenolic antioxidant having up to three phenolic hydroxyl groups, and from about 0.001% to about 15% by weight of tannic acid.

6. A mixture comprising 3,4-dihydro-1,2-pyran-2-carboxaldehyde and tannic acid, the 3,4-dihydro-1,2-pyran-2-carboxaldehyde being stabilized against non-actinic autopolymerization by tannic acid.

7. As a new composition of matter, a mixture comprising 3,4-dihydro-1,2-pyran-2-carboxaldehyde, from about 0.001% to about 15% by weight thereof of tannic acid, and from about 0.005% to about 5% by weight thereof of hydroquinone.

RICHARD R. WHETSTONE.

REFERENCES CITED

The following references are of record in the file of this patent:

UNITED STATES PATENTS

| Number | Name | Date |
|---|---|---|
| 2,104,760 | Renfrew | Jan. 11, 1938 |

FOREIGN PATENTS

| Number | Country | Date |
|---|---|---|
| 540,167 | Great Britain | Oct. 8, 1941 |

OTHER REFERENCES

Sherlin et al., Chemical Abstracts, vol. 32, 1938, page 5398.